(Model.)
B. A. SMITH.
BICYCLE ATTACHMENT.
No. 515,800. Patented Mar. 6, 1894.
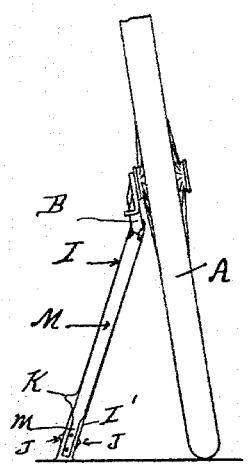
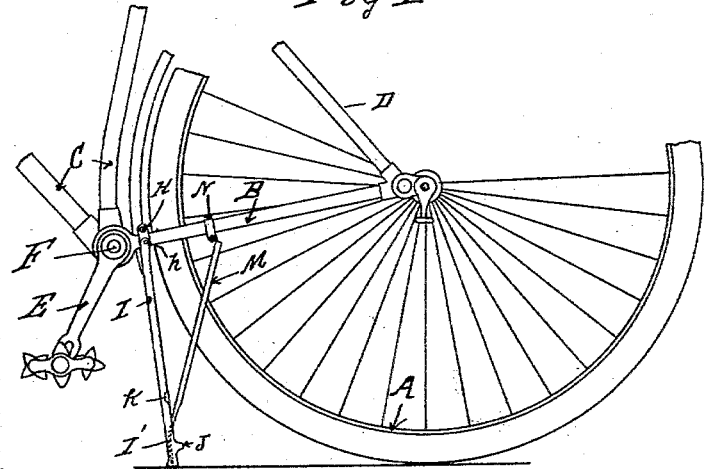
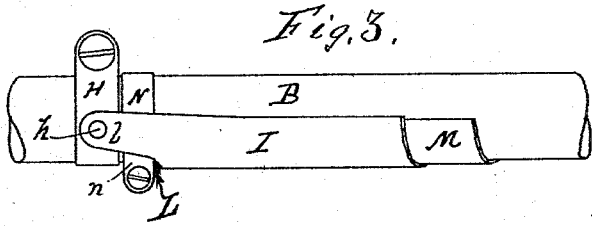
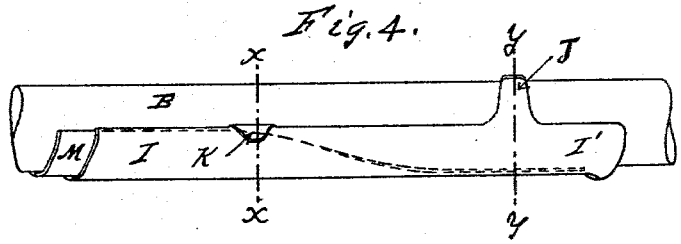
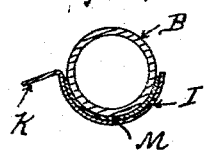
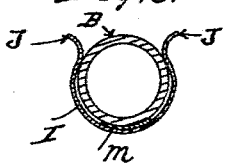
WITNESSES.
F. Einfeldt
F. J. Barrett
INVENTOR.
Byron A. Smith
By J. C. Shurgrove
Atty
THE NATIONAL LITHOGRAPHING COMPANY,
WASHINGTON, D. C.

UNITED STATES PATENT OFFICE.

BYRON A. SMITH, OF ERIE, PENNSYLVANIA.

BICYCLE ATTACHMENT.

SPECIFICATION forming part of Letters Patent No. 515,800, dated March 6, 1894.

Application filed November 13, 1893. Serial No. 490,814. (Model.)

*To all whom it may concern:*

Be it known that I, BYRON A. SMITH, a citizen of the United States, residing at the city of Erie, in the county of Erie and State of Pennsylvania, have invented certain new and useful Improvements in Bicycle Attachments; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in bicycle attachments, hereinafter set forth and explained, and illustrated in the accompanying drawings in which—

Figure 1. shows a side view in elevation of a portion of a bicycle embodying my improved attachment. Fig. 2. shows a rear view in elevation of the same. Fig. 3. is an enlarged side elevation of a section of the front end of one of the side bars of a bicycle, showing the upper part of my improved attachment hinged to and folded up against the same. Fig. 4. is a like side elevation of a section of the rear end of one of the side bars of a bicycle, showing the lower end of my improved attachment folded up against the same. Fig. 5. is a transverse section of one of the side bars of a bicycle with my improved attachment folded up against the same on the line $x, x$, in Fig. 4. Fig. 6. is a transverse section of one of the side bars of a bicycle with my improved attachment folded up against the same on the line $y, y$, in Fig. 4.

In the construction of my invention, shown in the drawings, A is a section of a wheel, B one of the side bars, C, D, portions of the frame, and E the pedal mechanism of a bicycle, all of which are of usual and ordinary construction.

Around the side bar B adjacent to the bearing F of the pedal shaft, I clamp a ring H, from the sides of which project studs $h$. Upon these studs $h$ is pivoted a semi-tubular standard I of such length that when down in the position illustrated in Figs. 1 and 2, the lower end I' thereof will rest upon the ground, when the wheel stands substantially at the angle illustrated in Fig. 2. This standard I is preferably made of a single strip of spring steel, cut out with ears or lips J, J, thereon near the lower end thereof, and also, preferably, with a projecting ear or lip K on one side thereof, so when the standard I is shaped up into a semi-tubular form, the ears J, J, operate as spring clamps which will close around the side bar B, and retain the standard I in close contact therewith, as illustrated in Figs. 3, 4, 5 and 6.

At the upper end of the standard I, it is cut away at L, so as to form ears $l$ thereon, by means whereof it is pivoted upon the studs $h$ on the ring H.

To the inside of the lower end I' of the standard I, is secured a semi-tubular brace M, of such size as to lie closely inside of the standard I. At the lower end of the brace M, the sides thereof are cut away, as illustrated in Fig. 2, and in dotted lines in Fig. 4, so as to leave a long narrow strip $m$, which is riveted to the inside of the lower end of the standard I, as shown in Fig. 2; this strip $m$, above the rivets which secure it in place, operates as a spring, so that when the standard I is down, the upper end of the brace M is thrown outward, as illustrated in Fig. 1. To the upper end of the brace M is pivoted a loose ring N, which slides freely back and forth on the side bar B, and when the standard I and the brace M are folded up, as illustrated in Figs. 3 and 4, the ear $n$ on said loose sliding ring N passes down through the opening L in the upper end of the standard I; thus allowing the brace M to fold compactly within the standard I, so that they will fit closely around the lower part of the side bar B when folded up, as illustrated in Figs. 3 and 4.

In operation, the rider can at any time press his foot upon the lip or projection K and throw the standard down, the spring brace M operating automatically thereon, and he can also raise the standard in the same manner.

Having thus fully described my invention so as to enable others to construct and use the same, what I claim as new, and desire to secure by Letters Patent of the United States, is—

1. The combination with a bicycle, of a semi-tubular standard, pivoted to one of the side bars of the bicycle, and a semi-tubular spring brace secured at its lower end to said standard, and at its upper end to a loose ring embracing and sliding on said side bar. substantially as and for the purpose set forth.

2. The combination with a bicycle, of a semi-tubular standard, pivoted at its upper end to a ring clamped upon one of the side bars of the bicycle, ears on the lower end of said standard adapted to spring around the side bar, when said standard is folded up under the side bar, a semi-tubular spring brace secured at its lower end to the standard, and at its upper end to a loose ring sliding freely on the side bar, and adapted to fold up under and against the side bar within the standard. substantially as set forth.

3. The combination with the side bar B of a bicycle, of a semi-tubular standard I pivoted to a ring H thereon, ears J, J, on said standard, adapted to embrace said side bar, and a semi-tubular spring M secured at its lower end to said standard, and pivoted at its upper end to a loose sliding ring N, and adapted to close within said standard, when folded up against the side bar. substantially as and for the purpose set forth.

In testimony whereof I affix my signature in presence of two witnesses.

BYRON A. SMITH.

Witnesses:
 JOHN S. RILLING,
 EMIL L. RILLING.